3,221,058
AROMATIC POLYETHERS
Johannes W. Engelsma and Robert van Helden, Amsterdam, Netherlands, assignors to Shell Oil Company, New York, N.Y., a corporation of Delaware
No Drawing. Filed Feb. 13, 1961, Ser. No. 88,668
Claims priority, application Netherlands, Apr. 22, 1960, 250,752
3 Claims. (Cl. 260—613)

This invention relates to novel polyphenyl ether mixtures and to a process for preparing them. More particularly, it relates to a process for preparing a novel mixture of polyphenyl ethers employing gas-phase halogenation and to the resulting mixture.

Polyphenyl ethers have been found to be superior lubricants and functional fluids because of their excellent thermal-, oxidation- and radiation-resistance, coupled with desirable properties of inertness, low volatility and chemical inertness. Because of these properties, the polyphenyl ethers are particularly useful as synthetic lubricants for high performance gas turbine engines, as well as for application as heat exchange and hydraulic fluids, and as nuclear reactor moderators. One class of ethers that has proved extremely effective for such applications has been those ethers having $n$ phenyl or phenylene groups interconnected by $(n-1)$ divalent oxy radicals, where $n$ is an integer from 3 to 8.

It is an object of the present invention to provide a new class of polyphenyl ether lubricants. Another object is the provision of a process for preparing such polyphenyl ethers. Still another object is the provision of a novel process for preparing polyphenyl ether mixtures economically and in high yield. Another object is the provision of a gas-phase method for preparing polyphenyl ethers. Other objects will be apparent from the following description of the invention.

These objects are accomplished in the invention by the process which comprises reacting together in the vapor phase an aromatic ether and a halogen, in a molar ratio of about 3 to 1, and separating from the resulting mixture the non-halogenated polyphenyl ether product.

The aromatic ether reactants in the process of the invention are those compounds having at least two aromatic nuclei separated by a divalent oxy etheric linkage. These compounds have the general formula Ar—O—Ar where each Ar is an aromatic radical, preferably hydrocarbon. The radicals are made up of six-membered rings which may or may not be substituted; exemplary substituents are alkyl groups, preferably having no more than four carbon atoms. Exemplary ethers include dinaphthyl ether, dixylyl ether, phenyl naphthyl ether, diphenyl phenyl ether, and the like, of which the most advantageous embodiment is diphenyl ether. Most conveniently, each aromatic radical Ar has no more than two aromatic nuclei, each of which is mononuclear or fused binuclear, e.g., phenyl, tolyl, xylyl, naphthyl, etc. Since desirable polyphenyl ether products are those having at least one meta linkage, it is desirable that on at least one aromatic nucleus at least one ring carbon atom meta to the etheric oxygen is substituted only with hydrogen.

The ether from the class described is reacted in the process of the invention at elevated temperature and in the vapor phase with a gaseous halogen. Exemplary halogens are chlorine, bromine and iodine, of which the first two are preferred. The halogen and the aromatic ether are brought together in the vapor phase in a first reaction zone heated to a temperature above the boiling temperature of the ether. In general, temperatures in excess of about 200° C. give best results. For example, with diphenyl ether, excellent yields of products are obtained at temperatures between about 260° C. and 500° C., and best results between 350° C. and 450° C. On the other hand, temperatures above about 600° C. are not necessary, although such elevated temperatures may be employed if desired.

While the process of the invention may be conducted in a batch, semi-batch or continuous manner, the process lends itself with particular facility to being practiced in a continuous mode. Thus, while the reaction zone may take the form of a heated vessel of any convenient configuration, it has been found convenient merely to pass the aromatic ether and the halogen through a tube heated in an electric furnace, whereupon substantial reaction takes place when the reactants have reached reaction temperature.

The nature of the products obtained depend not only on the temperature of the reaction and the nature of the reactants but also on the relative proportions of the reactants employed. If a large molar excess of the halogen is employed, the effluent from the reaction zone contains principally halogenated aromatic ether products. However, by increasing the molar concentration of the aromatic ether relative to the halogen, dehydrogenation as well as halogenation takes place, and the yield of dehydrogenation products may be substantially increased. When the mole ratio of ether to halogen is greater than about 3 to 1, the dehydrogenation reaction

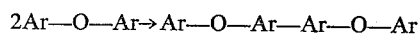

2Ar—O—Ar→Ar—O—Ar—Ar—O—Ar is found to take place in substantial yield. This is somewhat surprising, since in such gas-phase reactions between aromatics and halogens in the literature, only halogenated products have been obtained. With increase in the aromatic ether concentration, the yield of dehydrogenation product also increases. Thus, when diphenyl ether and chlorine are reacted in a molar ratio of 25/1, the product consists of 70% dehydrogenation products and 30% halogenated products. The use of molar ratios exceeding about 40/1 is possible but is not economically attractive. If desired, an inert gaseous diluent may be employed. Suitable gases may include nitrogen, helium, argon and the like.

By proper selection of reaction conditions, it is possible to obtain dehydrogenation products as the principal product of the process. These products consist of a mixture of polyphenyl ethers having the structure

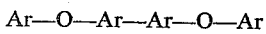

Ar—O—Ar—Ar—O—Ar as noted above. For example, employing diphenyl ether as the aromatic ether reactant, the dehydrogenation products comprise a mixture of polyphenyl ethers, wherein each ether has the structure

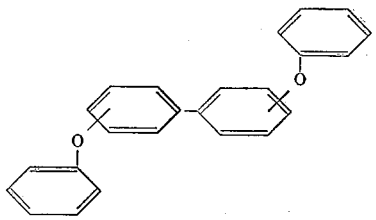

and the phenoxy groups are chiefly bound in the meta position relative to the diphenyl bond. Such a mixture is a liquid characterized by a high boiling point and which is a superior lubricant.

In general, however, it is difficult to obtain a product mixture free of halogenated aromatic ether products. If desired, of course, the mixture of dehydrogenation products and halogenation products may be used as a functional fluid. However, the presence of halogen substituents on the aromatic ether components of the mixture renders the total product mixture somewhat corrosive, and it is preferable to employ a polyphenyl ether substantially free of halogens.

The halogenated products may, of course, be separated from the non-halogenated products by a variety of methods, e.g., fractional distillation, extraction and the like. However, in the preparation of polyphenyl ethers for lubricant applications, it is both convenient and desirable to react these halogenated products with metal phenates in order to produce other polyphenyl ethers.

Thus, the effluent stream from the gas-phase reaction zone is treated to separate therefrom unreacted halogen and product hydrogen halide. Most conveniently, the separation is achieved by cooling the effluent stream and mixing it with aqueous caustic. The caustic takes up the hydrogen halide and unreacted halogen but is immiscible with the effluent organic phase and may be readily separated from that phase in its turn. Alternatively, other separation means, such as other aqueous or organic washes, or solid absorbers, may be employed.

After the caustic wash, the effluent stream containing the halogenated and non-halogenated organic ethers is washed to remove the caustic and dried and, if desired, it may be diluted with aromatic such as benzene, paraffins or other inert diluents.

The reaction mixture so treated is then treated with the phenate of an alkali or alkaline earth metal. By phenate is meant a phenolic derivative of a hydroxyaromatic compound, the derivative having the formula $$(Ar-O-)_mM$$

where Ar has the above meaning and M is an $m$-valent metal ion selected from the above class of metals. Typical phenates include potassium phenate, sodium phenate, calcium phenate, calcium naphtholate, sodium naphtholate, potassium cresolate, potassium naphtholate, potassium phenoxyphenate, potassium alpha-cumyl phenate; sodium p-tert-butyl phenoxy phenate, and lithium m-phenoxyphenoxy phenate, and the like. Thus, the halogen substituents are replaced with phenoxide or naphthoxide groups to afford polyphenyl ethers. Of the alkali metal phenates, the potassium phenates are most reactive and are therefore preferred. Thiophenates may also be used, if it is desired, in order to introduce sulfur into the polyether, e.g., sodium thiophenate, potassium thiophenate and lithium thiocresylate.

For example, when dichlorodiphenyl ether is reacted with potassium phenoxide, the product is bis(phenoxyphenyl)ether:

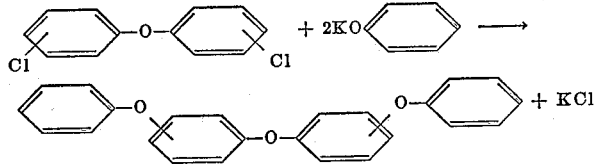

Since the halogenated aromatic ethers represent a mixture of isomers, the resulting mixture of polyphenyl ethers is correspondingly isomeric. In general, the polyphenyl ethers obtained are those having $n$ aryl or arylene groups separated by $(n-1)$ divalent oxy radicals, the number of aryloxy substituents on the basic aromatic ether nucleus depending on the degree of halogenation of the halogenated aromatic ether intermediate. Thus, $n$ is an integer from 3 to 8, and preferably from 3 to 6. Ethers made up of phenyl and substantially phenylene groups, particularly those having the linear structure

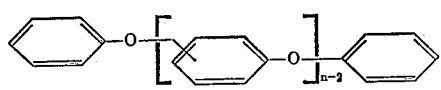

have been found to have the best over-all lubricating properties.

Typical of the polyphenyl ethers prepared in this manner from halogenated diphenyl oxide and alkali metal phenate are di(phenoxy)benzene; di(phenoxyphenyl)ether; di(phenoxyphenoxy)benzene; and di(phenoxyphenoxyphenyl)ether. Since these compounds will be present in the reaction product as a mixture of isomers, the resulting mixture is a stable high-boiling liquid of excellent lubricity.

The reaction between the halogenated aromatic ether and the phenate is most conveniently conducted in the presence of a catalytic amount of a copper-containing catalyst. Typical catalysts include metallic copper, metallic copper-bronze and other copper alloys, and such copper salts as cupric chloride, cuprous chloride, cupric acetate, copper tartrate, copper oxide and copper sulfate. Amounts of the catalyst on the order of about 1 to 20 grams per mole of phenate have been found to give excellent results, although greater or lesser amounts of catalyst may be employed. Best results are obtained with the metal catalyst in finely-divided form, i.e., as a powder.

In the reaction between the halogenated aromatic ether and the phenate, it has been found effective to keep the reaction mixture in the liquid state by adding a phenol. This solvent affords a medium with which all of the ingredients are readily compatible, in which reaction is rapid, and from which the products are readily separated. Best results are obtained by using a phenol having the formula ArOH, where the Ar radical corresponds to that of the phenate reactant employed. In one embodiment of the invention, the phenate is prepared by reacting a stoichiometric excess of the phenol or naphthol with the alkali metal or alkaline earth hydroxide employed. Preferably, a substantial excess, such as twice the stoichiometric amount, of the phenol is employed. In this way, the resulting mixture will contain both the phenate and the phenol, and to this may be added the halogenated aromatic ether.

After the reaction, any excess of the phenate, together with the phenol or naphthol solvent, may be easily separated from the products by washing the reaction system with water, or with caustic or other aqueous hydroxide. In this way, the high-molecular weight polyethers are recovered in a pure and readily recoverable state. Alternatively, such other separation methods as extraction or fractional distillation may be employed for recovery of the polyphenyl ethers from the reaction system.

If the dehydrogenation polyphenyl ether products of the halogen-aromatic ether reaction are introduced into the phenate reaction system, the final products are mixtures of the dehydrogenation products from the first stage and the polyphenyl ethers from the second. Such mixtures are light-colored oily liquids having a high boiling point and excellent lubricating properties. Best lubricants are those containing from about 10% to about 90% by weight of dehydrogenation products having the formula $$Ar-O-Ar-Ar-O-Ar$$

while the remainder is made up of polyphenyl ethers having $n$ aryl or arylene groups, interconnected by $(n-1)$ divalent oxy radicals, where $n$ is an integer from 3 to 8. For example, a superior gas turbine engine lubricant, derived from diphenyl ether, is one containing about 50% $w$ of ethers having the structure

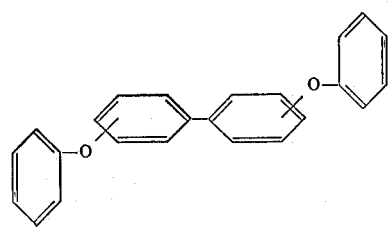

and the remainder of ethers having the structure

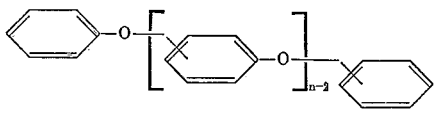

where *n* is an integer from 3 to 8.

The following examples will illustrate the nature and advantages of the products and processes of the invention. It should be understood, however, that the examples are merely illustrative and are not to be regarded as limitations to the appended claims, since the basic teachings thereof may be varied at will as will be understood by one skilled in the art.

*Example I*

Streams of 246 mmols/hour of diphenyl oxide and 47 mmols/hour of $Cl_2$ were led, after being preheated separately to 450° C. for three hours through a tubular reactor heated to 450° C. Before the preheating zone nitrogen was added in quantities of 75 mmols per hour to both the diphenyl oxide and chlorine streams. The residence time in the reaction tube was 57 seconds. The gas mixture emerging from the reaction tube was passed through a cooling tube in which it was rapidly cooled to 10° C. At the end of this tube, an excess of 2 N aqueous NaOH was added and the whole collected in a receiver where an organic and an aqueous layer separated. These were removed and subjected separately to further treatment. No chlorite or chlorate ions were found in the aqueous layer. This showed that the chlorine added had been completely converted in the reactor. The aqueous layer was acidified with $HNO_3$ and potentiometrically titrated with $AgNO_3$. Of the 282 (i.e., 3×2×47) milliequivalents of chlorine led into the reactor, 182 were identified as chlorine ions. One hundred milliequivalents of chlorine were therefore used in substitution reactions. This means that 82 milliequivalents of chlorine, i.e., 29% of the total quantity added, were converted during the dehydrogenation of the diphenyl oxide. Hence, 29% of the diphenyl oxide converted was dehydrogenated and 71% substituted.

The organic layer was diluted with carbon tetrachloride, washed with water and dried with $Na_2SO_4$. The solvent was distilled off and the residue distilled in vacuo at 17 mm. Hg and 127° C. to remove and recover unconverted diphenyl oxide. The residue of this distillation weighed 32 grams. The product was analyzed by infrared and mass-spectroscopic methods. The principal dehydrogenation products in the mixture were found to be polyphenyl ethers in addition to traces of dibenzofuran. The chlorine content of the product was 10.1% by weight. A quantity of 1.75 grams of potassium was dissolved in 200 ml. of tert.-butanol and 25 grams of phenol added to the solution. The tert-butanol and 15 grams of phenol were then again distilled. The mixture containing potassium phenate was heated for 90 hours to 300° C. in a Carius tube with 15 grams of the chlorine-containing product in the presence of 0.1 gram of copper powder. The mixture was washed with water and a dilute aqueous NaOH solution and dried with $Na_2SO_4$. Yield: 15 grams. The chlorine content of the product was found to be less than 0.1% by weight.

*Example II*

Streams of 344 mmols/hour of diphenyl oxide and 13.75 mmols/hour of $Cl_2$ were led, after being preheated separately to 400° C., for 14¾ hours through a tubular reactor heated to 400° C. Before the preheating zone nitrogen was added in quantities of 50 mmols per hour to both the diphenyl oxide and the chlorine streams. The residence time in the reaction tube was 59 seconds. The gas mixture emerging from the reaction tube was cooled and mixed with NaOH as described in Example I. An organic and an aqueous layer separated in the receiver. These were removed and subjected separately to further treatment. The fact that no chlorate or chlorite ions could be identified in the aqueous layer showed that the chlorine had been completely converted in the reactor. In the same way, as described in Example I, the percentage of the diphenyl oxide converted into dehydrogenation products was determined and found to be 70%.

The organic layer was diluted with carbon tetrachloride, washed with water and dried with $Na_2SO_4$. The solvent was distilled off and unconverted diphenyl oxide recovered by vacuum distillation. The residue of this distillation weighed 35 grams. It was established by means of infrared and mass-spectroscopic examination that the dehydrogenation products present in the mixture consisted chiefly of polyphenyl ethers in addition to traces of dibenzofuran. The chlorine content of the product was 6.65% by weight.

A quantity of 2.5 grams of potassium was dissolved in 200 ml. of tert-butanol and 25 grams of phenol were added to the solution. The tert-butanol and 15 grams of phenol were then again distilled. The mixture containing potassium phenate was heated for 90 hours to 300° C. in a Carius tube with 30.6 grams of the chlorine-containing product in the presence of 0.1 gram of copper powder. The product was washed with water and dilute aqueous NaOH and dried with $Na_2SO_4$. The chlorine content was found to be less than 0.1% by weight.

The aromatic polyethers prepared according to the present process may be used for all the above-mentioned purposes.

*Example III*

Using the methods described, ether mixtures having the following compositions are readily prepared:

| PERCENT WEIGHT | |
|---|---|
| 10 | 90 |
| 40 | 60 |
| 50 | 50 |
| 70 | 30 |
| 90 | 10 |

All of these mixtures are oily liquids of intermediate viscosity at room temperature.

We claim as our invention:

1. A mixture of polyphenyl ethers prepared by passing in the vapor phase, diphenyl ether and chlorine, in a molar ratio of at least about 3 to 1, through a first reaction zone at a temperature of about 260° C. to about 500° C. to achieve substantial reaction of diphenyl ether and chlorine, treating the effluent stream from said zone with caustic to separate the inorganic components therefrom, and treating the resulting stream with the phenate of a metal selected from alkali and alkaline earth metals in a liquid phenol corresponding to that from which the phenate is derived, in the presence of a copper catalyst, to obtain a mixture of polyphenyl ethers.

2. The process for preparing a mixture of polyphenyl ethers which comprises passing in the vapor phase diphenyl ether and chlorine, in a molar ratio of at least about 3 to 1, through a first reaction zone at a temperature of about 260° C. to about 500° C. to achieve substantial reaction of diphenyl ether and chlorine, treating the effluent stream from said zone with caustic to separate the inorganic components thereof, and treating the resulting stream with the phenate of a metal selected from alkali and alkaline earth metals in a liquid phenol corresponding to that from which the phenate is derived, in the presence of a copper catalyst, to obtain a mixture of polyphenyl ethers.

3. The process for preparing a mixture of isomeric bis(phenoxy)diphenyls which comprises reacting together in the vapor phase at a temperature of about 260° C. to about 500° C. diphenyl ether and chlorine in a molar ratio of at least about 3 to 1 to form a product consisting of said mixture of bis(phenoxy)diphenyls and chlorinated diphenyl ether and separating a mixture of isomeric bis(phenoxy)diphenyls from chlorinated diphenyl ether.

References Cited by the Examiner

UNITED STATES PATENTS

| 1,867,968 | 7/1932 | Dow | 252—52 |
|---|---|---|---|
| 1,932,595 | 10/1933 | Muth et al. | 260—613 |
| 2,022,634 | 11/1935 | Britton et al. | 260—612 |
| 2,095,619 | 10/1937 | Stoesser et al. | 260—612 |
| 2,196,576 | 4/1940 | Coleman et al. | 260—613 |
| 2,355,616 | 8/1944 | Barker | 260—612 |
| 3,006,852 | 10/1961 | Barnum et al. | 252—52 |
| 3,034,700 | 5/1962 | Hickman | 260—613 |

FOREIGN PATENTS 853,095  11/1960  Great Britain.

OTHER REFERENCES

Blake et al.: High-Temperature Hydraulic Fluids, Part III, WADC Technical Report 54–532, ASTIA Document No. AD 118179, April 1957, page 44.

Engelsma et al.: Rec. Trav. Chim Pay-Bas, vol. 76 (1957), pp. 325–334.

Engelsma et al.: Proc. Chem. Soc. (1958), pages 258–59.

LEON ZITVER, *Primary Examiner.*

JULIUS GREENWALD, *Examiner.*